J. AND N. GERKE AND E. C. WILLIAMS.
INDICATOR FOR AUTOMOBILES.
APPLICATION FILED DEC. 5, 1916.
1,343,361.
Patented June 15, 1920.
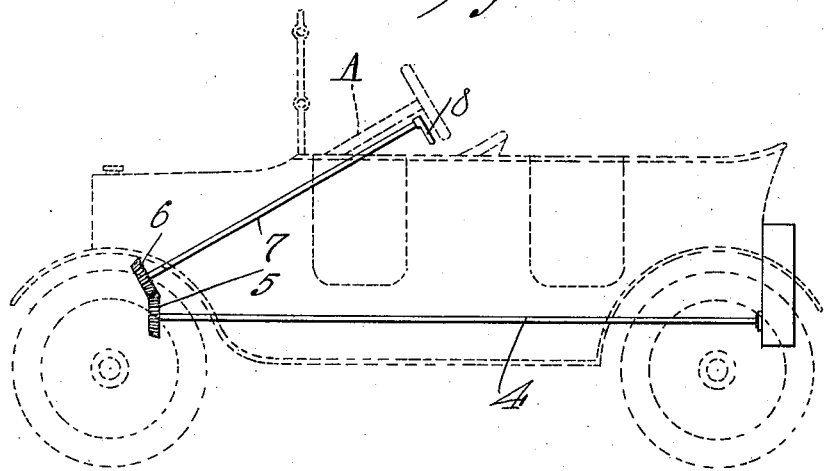
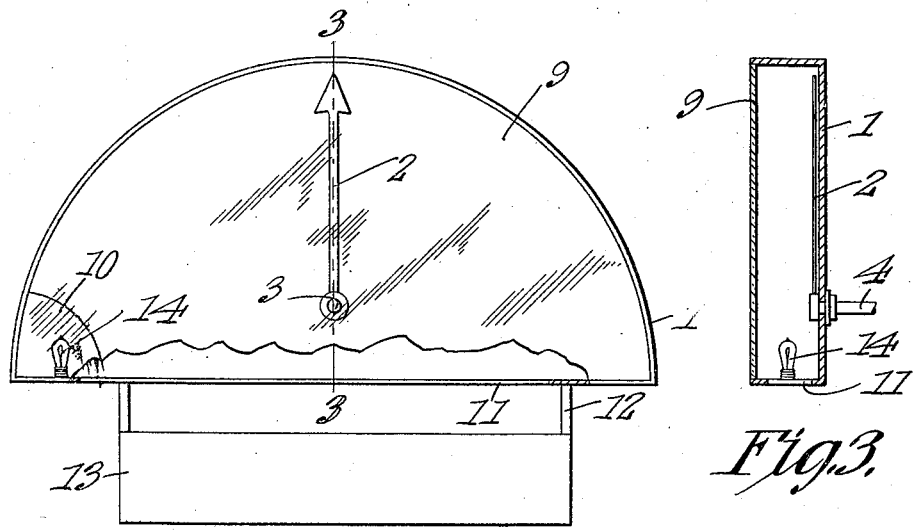
Witnesses
Inventors
J. Gerke,
N. Gerke and
E. C. Williams,
by
Attorneys

UNITED STATES PATENT OFFICE.

JOSEPH GERKE, NICHOLAS GERKE, AND EDWIN C. WILLIAMS, OF MILWAUKEE, WISCONSIN.

INDICATOR FOR AUTOMOBILES.

1,343,361.     Specification of Letters Patent.     Patented June 15, 1920.

Application filed December 5, 1916. Serial No. 135,178.

*To all whom it may concern:*

Be it known that we, JOSEPH GERKE, NICHOLAS GERKE, and EDWIN C. WILLIAMS, citizens of the United States, residing at Milwaukee, in the county of Milwaukee, State of Wisconsin, have invented a new and useful Indicator for Automobiles, of which the following is a specification.

This invention relates to indicators for use in connection with motor vehicles, one of its objects being to provide a simple and compact structure which can be placed readily upon a vehicle and which utilizes a movable index or pointer under the control of the driver for indicating the direction in which the vehicle is to turn.

A further object is to provide an indicator utilizing a single lamp which serves to illuminate the index or pointer and its housing, a red tail glass, and the license tag suspended below the housing.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the apparatus in position, a motor vehicle being indicated by dotted lines.

Fig. 2 is a rear elevation of the indicator, a portion of its housing being broken away.

Fig. 3 is a section on line 3—3 Fig. 2.

Referring to the figures by characters of reference 1 designates a substantially semicircular housing adapted to be secured in any suitable manner to the rear of a motor vehicle, and mounted within this housing is an index or pointer 2 adapted to swing to one side or the other about a center 3. This index or pointer can be connected to a longitudinal shaft 4 receiving motion through meshing gears 5 and 6 from a shaft 7 which extends upwardly along the steering post A and has a handle 8 whereby it can be easily rotated in a desired direction. For example, when the vehicle is to turn to the left, the driver can swing the handle 8 to the left and motion will thus be transmitted through the gears to the shaft 4 and said shaft caused to swing the index or pointer 2 toward the left.

The back of the housing is closed by a transparent sheet 9 of glass or other suitable material and the lower left hand corner of this glass closure is preferably colored red, this colored portion being indicated at 10.

A longitudinal slot 11 is formed in the bottom of the housing and supported from the housing and adjacent the slot by means of hangers 12 or the like is a license tag 13 so located as to be illuminated by rays of light passing through the slot 11 from a lamp 14 which is mounted within the housing and back of the colored portion 10 of the glass.

Obviously when the single lamp 14 is illuminated certain of the rays of light will pass through the colored portion of the glass. Other rays will illuminate the interior of the housing so that the index or pointer 2 can be clearly seen. Additional rays will pass downwardly through the slot 11 and illuminate the license tag. Thus by the use of a single lamp the various parts can be clearly seen at night and it does not become necessary to use three lights, one as a tail light, the other as a means for illuminating the indicator and a third as a means for illuminating the license tag.

While a shaft and gears have been illustrated as an operating means for the index or pointer, it is to be understood that any other desired mechanism may be used for this purpose.

What is claimed is—

An attachment for motor vehicles including a housing having a single compartment therein, the back wall of the compartment being transparent and having a red translucent corner portion, a shiftable pointer within the compartment and visible through the transparent wall, and a single lamp housed within the compartment and concealed by the red translucent portion of the wall for illuminating the translucent and transparent portions of the wall, and for illuminating the pointer while in any one of its positions, there being an opening in the bottom of the housing for the escape of light rays from said lamp to illuminate a license tag supported below the housing.

In testimony that we claim the foregoing as our own we have hereto affixed our signatures in the presence of two witnesses.

JOSEPH GERKE.
NICHOLAS GERKE.
EDWIN C. WILLIAMS.

Witnesses:
GERHARD A. BASSE,
ELSIE RODEMANN.